United States Patent
Shen et al.

(10) Patent No.: US 10,965,327 B2
(45) Date of Patent: *Mar. 30, 2021

(54) TERMINAL AND COMMUNICATION METHOD THEREOF

(71) Applicant: Huawei Technologies Co., Ltd., Shenzhen (CN)

(72) Inventors: Li Shen, Beijing (CN); Bangshi Yin, Beijing (CN); Kun Li, Beijing (CN); Songping Yao, Beijing (CN); Anmin Xu, Shenzhen (CN); Shumin Liu, Beijing (CN); Shui Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/723,395

(22) Filed: Dec. 20, 2019

(65) Prior Publication Data

US 2020/0127689 A1    Apr. 23, 2020

Related U.S. Application Data

(63) Continuation of application No. 15/748,964, filed as application No. PCT/CN2016/091926 on Jul. 27, 2016, now Pat. No. 10,554,231.

(30) Foreign Application Priority Data

Jul. 30, 2015   (CN) .......................... 201510465878.7
Aug. 12, 2015   (CN) .......................... 201510493931.4

(51) Int. Cl.
*H04B 1/00*     (2006.01)
*H04W 88/06*    (2009.01)
(Continued)

(52) U.S. Cl.
CPC ......... *H04B 1/0064* (2013.01); *H04B 1/3816* (2013.01); *H04B 7/04* (2013.01);
(Continued)

(58) Field of Classification Search
CPC ...... H04B 1/0064; H04B 1/3816; H04B 7/04; H04B 7/0689; H04W 8/183; H04W 88/06
See application file for complete search history.

(56) References Cited

U.S. PATENT DOCUMENTS 8,725,101 B2    5/2014   Ruohonen et al.
2005/0009484 A1  1/2005   Imai et al.
(Continued)

FOREIGN PATENT DOCUMENTS

CN    101494929 A    7/2009
CN    202135121 U    2/2012
(Continued)

OTHER PUBLICATIONS

Machine Translation and Abstract of Chinese Publication No. CN103002433, Mar. 27, 2013, 10 pages.
(Continued)

*Primary Examiner* — Dinh Nguyen
(74) *Attorney, Agent, or Firm* — Conley Rose, P.C.

(57) ABSTRACT

A terminal includes: a first baseband processor, a second baseband processor, a first radio frequency chip, a second radio frequency chip, a first antenna, a second antenna, a third antenna, and a fourth antenna. The first baseband processor is connected to the first antenna and the second antenna by using the first radio frequency chip. The first radio frequency chip is connected to the first antenna to form a first channel, and is connected to the second antenna to form a second channel. The second baseband processor is connected to the third antenna and the fourth antenna by using the second radio frequency chip. The second radio (Continued)

frequency chip is connected to the third antenna to form a third channel, and is connected to the fourth antenna to form a fourth channel.

20 Claims, 2 Drawing Sheets

(51) Int. Cl.
   *H04B 7/04* (2017.01)
   *H04B 1/3816* (2015.01)
   *H04B 7/06* (2006.01)
   *H04W 8/18* (2009.01)
(52) U.S. Cl.
   CPC .......... *H04B 7/0689* (2013.01); *H04W 8/183* (2013.01); *H04W 88/06* (2013.01)

(56) References Cited

U.S. PATENT DOCUMENTS

| | | |
|---|---|---|
| 2005/0014477 A1 | 1/2005 | Ballantyne |
| 2009/0270128 A1 | 10/2009 | Jheng et al. |
| 2011/0151858 A1 | 6/2011 | Lai |
| 2012/0182938 A1 | 7/2012 | Mujtaba et al. |
| 2012/0287887 A1 | 11/2012 | Jung et al. |
| 2013/0058216 A1 | 3/2013 | Krishnaswamy et al. |
| 2013/0156081 A1 | 6/2013 | Tat et al. |
| 2014/0185498 A1 | 7/2014 | Schwent et al. |
| 2014/0194157 A1 | 7/2014 | Ezekiel et al. |
| 2015/0334575 A1 | 11/2015 | Joshi et al. |
| 2016/0365995 A1 | 12/2016 | Liu et al. |
| 2016/0374057 A1* | 12/2016 | Takano ................. H04W 16/14 |

FOREIGN PATENT DOCUMENTS

| | | |
|---|---|---|
| CN | 103002433 A | 3/2013 |
| CN | 103209502 A | 7/2013 |
| CN | 103368622 A | 10/2013 |
| CN | 103379672 A | 10/2013 |
| CN | 103731889 A | 4/2014 |
| CN | 103781202 A | 5/2014 |
| CN | 103875307 A | 6/2014 |
| IN | 2402CHE2011 A | 2/2013 |
| JP | 2014531148 A | 11/2014 |
| JP | 2015008505 A | 1/2015 |
| KR | 20110112172 A | 10/2011 |
| WO | 2014127521 A1 | 8/2014 |
| WO | 2014151583 A1 | 9/2014 |
| WO | 2015105813 A2 | 7/2015 |
| WO | 2016077151 A1 | 5/2016 |

OTHER PUBLICATIONS

Machine Translation and Abstract of Chinese Publication No. CN103379672, Oct. 30, 2013, 31 pages.
Machine Translation and Abstract of Chinese Publication No. CN103731889, Apr. 16, 2014, 23 pages.
Machine Translation and Abstract of Chinese Publication No. CN202135121, Feb. 1, 2012, 12 pages.
Machine Translation and Abstract of Chinese Publication No. CN101494929, Jul. 29, 2009, 11 pages.
Machine Translation and Abstract of Chinese Publication No. CN103209502, Jul. 17, 2013, 25 pages.
Foreign Communication From a Counterpart Application, PCT Application No. PCT/CN2016/091926, English Translation of International Search Report dated Oct. 28, 2016, 2 pages.
Foreign Communication From a Counterpart Application, PCT Application No. PCT/CN2016/091926, English Translation of Written Opinion dated Oct. 28, 2016, 5 pages.
Foreign Communication From a Counterpart Application, European Application No. 16829855.2, Extended European Search Report dated Jun. 22, 2018, 8 pages.
Foreign Communication From a Counterpart Application, Chinese Application No. 201510493931.4, Chinese Office Action dated Sep. 28, 2018, 7 pages.
Foreign Communication From a Counterpart Application, Korean Application No. 10-2018-7005290, Korean Office Action dated Jan. 11, 2019, 5 pages.
Foreign Communication From a Counterpart Application, Korean Application No. 10-2018-7005290, English Translation of Korean Office Action dated Jan. 11, 2019, 4 pages.
Foreign Communication From a Counterpart Application, Japanese Application No. 2018-504678, Japanese Office Action dated Jan. 28, 2019, 3 pages.
Foreign Communication From a Counterpart Application, Japanese Application No. 2018-504678, English Translation of Japanese Office Action dated Jan. 28, 2019, 4 pages.

* cited by examiner

TERMINAL AND COMMUNICATION METHOD THEREOF

CROSS-REFERENCE TO RELATED APPLICATIONS

This application is a continuation of U.S. patent application Ser. No. 15/748,964, filed on Jan. 30, 2018, which is a national stage of International Application No. PCT/CN2016/091926, filed on Jul. 27, 2016. The International Application claims priority to Chinese Patent Application No. 201510465878.7, filed on Jul. 30, 2015, and Chinese Patent Application No. 201510493931.4, filed on Aug. 12, 2015. All of the afore-mentioned patent applications are hereby incorporated by reference in their entireties.

TECHNICAL FIELD

Embodiments of the present invention relate to the field of communications technologies, and specifically to a terminal and a communication method thereof.

BACKGROUND 3G is a third-generation mobile communications technology, and is a cellular mobile communications technology supporting high-speed data transmission. Long Term Evolution (Long Term Evolution, LTE for short) is a new generation mobile communication standard developed by the $3^{rd}$ Generation Partnership Project ($3^{rd}$ Generation Partnership Project, 3GPP for short). Compared with other communication standards, LTE has a higher transmission rate and better transmission quality, and currently becomes a popular communication standard. An existing fourth-generation mobile communications technology (4G) may include two standards: TD-LTE (Time Division Long Term Evolution, Time Division Long Term Evolution) and FDD-LTE (Frequency Division Duplex Long Term Evolution, Frequency Division Duplex Long Term Evolution).

Two SIM (subscriber identity module, subscriber identity module) cards may be simultaneously inserted in a dual SIM mobile phone, and the two cards are both in standby mode. However, in existing dual SIM mobile phones, only one SIM card can support 3G or 4G services, and the other SIM can only support 2G services. Therefore, in the existing dual SIM mobile phones, the two SIM cards cannot simultaneously support 3G or 4G services.

SUMMARY

Embodiments of the present invention provide a terminal and a communication method thereof, so as to support 3G or later-generation services of multiple SIM cards.

A first aspect of the embodiments of the present invention provides a terminal, including: a first baseband processor, a second baseband processor, a first radio frequency chip, a second radio frequency chip, a first antenna, a second antenna, a third antenna, and a fourth antenna, where the first baseband processor is connected to a first card slot, the second baseband processor is connected to a second card slot, the first baseband processor, the second baseband processor, the first radio frequency chip, and the second radio frequency chip all support an access capability of a third-generation or later-generation mobile communications technology; the first baseband processor is connected to the first antenna by using the first radio frequency chip, and the first radio frequency chip is connected to the first antenna to form a first channel; the first baseband processor is connected to the second antenna by using the first radio frequency chip, and the first radio frequency chip is connected to the second antenna to form a second channel; the second baseband processor is connected to the third antenna by using the second radio frequency chip, and the second radio frequency chip is connected to the third antenna to form a third channel; and the second baseband processor is connected to the fourth antenna by using the second radio frequency chip, and the second radio frequency chip is connected to the fourth antenna to form a fourth channel, where the first channel, the second channel, the third channel, and the fourth channel are configured to transmit data between the terminal and an external device.

With reference to the first aspect, in a first possible implementation of the first aspect, the first baseband processor is connected to the second radio frequency chip by using a switch, and the first baseband processor is further configured to: when the first baseband processor transmits data by using the first channel, the first baseband processor transmits the data by using the first channel and the third channel if the third channel is idle.

With reference to the first aspect or the first possible implementation thereof, in a second possible implementation of the first aspect, the first baseband processor is further configured to: when the first baseband processor transmits data by using the first channel and the second channel, the first baseband processor transmits the data by using the first channel, the second channel, the third channel, and the fourth channel if the third channel and the fourth channel are idle; or when the first baseband processor transmits data by using the first channel and the second channel, the first baseband processor transmits the data by using the first channel, the second channel, and the third channel if the third channel is idle.

With reference to the first aspect or the first or second possible implementation thereof, in a third possible implementation of the first aspect, the first baseband processor and the second baseband processor are integrated in a processor; or the first baseband processor and the second baseband processor are independently disposed in the terminal.

With reference to any one of the first aspect or the first to the third possible implementations thereof, in a fourth possible implementation of the first aspect, the second antenna and the fourth antenna are a same antenna; or the second antenna and the fourth antenna are independently disposed in the terminal.

With reference to any one of the first aspect or the first to the fourth possible implementations thereof, in a fifth possible implementation of the first aspect, the first antenna and the third antenna are main antennas, and the second antenna and the fourth antenna are diversity antennas.

With reference to any one of the first aspect or the first to the fifth possible implementations thereof, in a sixth possible implementation of the first aspect, the third-generation or later-generation mobile communications technology includes: a third-generation mobile communications technology 3G, a fourth-generation mobile communications technology 4G, or a fifth-generation mobile communications technology 5G.

A second aspect of the embodiments of the present invention provides a communication method of a terminal. The terminal includes: a first baseband processor, a second baseband processor, a first radio frequency chip, a second radio frequency chip, a first antenna, a second antenna, a third antenna, and a fourth antenna, where the first baseband processor is connected to a first card slot, the second baseband processor is connected to a second card slot, the first baseband processor, the second baseband processor, the first radio frequency chip, and the second radio frequency chip all support an access capability of a third-generation or later-generation mobile communications technology; the first baseband processor is connected to the first antenna by using the first radio frequency chip, and the first radio frequency chip is connected to the first antenna to form a first channel; the first baseband processor is connected to the second antenna by using the first radio frequency chip, and the first radio frequency chip is connected to the second antenna to form a second channel; the second baseband processor is connected to the third antenna by using the second radio frequency chip, and the second radio frequency chip is connected to the third antenna to form a third channel; the second baseband processor is connected to the fourth antenna by using the second radio frequency chip, and the second radio frequency chip is connected to the fourth antenna to form a fourth channel, where the first channel, the second channel, the third channel, and the fourth channel are configured to transmit data between the terminal and an external device, and the first baseband processor is connected to the second radio frequency chip by using a switch; and the communication method includes: when the first baseband processor transmits data by using the first channel, transmitting, by the first baseband processor, the data by using the first channel and the third channel if the third channel is idle; or when the first baseband processor transmits data by using the first channel and the second channel, transmitting, by the first baseband processor, the data by using the first channel, the second channel, the third channel, and the fourth channel if the third channel and the fourth channel are idle; or when the first baseband processor transmits data by using the first channel and the second channel, transmitting, by the first baseband processor, the data by using the first channel, the second channel, and the third channel if the third channel is idle.

With reference to the second, in a first possible implementation of the second aspect, the first baseband processor and the second baseband processor are integrated in a processor; or the first baseband processor and the second baseband processor are independently disposed in the terminal.

With reference to the second aspect or the first possible implementation thereof, in a second possible implementation of the second aspect, the second antenna and the fourth antenna are a same antenna; or the second antenna and the fourth antenna are independently disposed in the terminal.

With reference to the second aspect or the first or the second possible implementation thereof, in a third possible implementation of the second aspect, the first antenna and the third antenna are main antennas, and the second antenna and the fourth antenna are diversity antennas.

With reference to any one of the second aspect or the first to the third possible implementations thereof, in a sixth possible implementation of the first aspect, the third-generation or later-generation mobile communications technology includes: a third-generation mobile communications technology 3G, a fourth-generation mobile communications technology 4G, or a fifth-generation mobile communications technology 5G.

According to the embodiments of the present invention, the terminal is provided with a first baseband processor and a second baseband processor. The first baseband processor is connected to a first antenna and a second antenna by using a first radio frequency chip, and the second baseband processor is connected to a third antenna and a fourth antenna by using a second radio frequency chip. The first radio frequency chip is connected to the first antenna to form a first channel, the first radio frequency chip is connected to the second antenna to form a second channel, the second radio frequency chip is connected to the third antenna to form a third channel, and the second radio frequency chip is connected to the fourth antenna to form a fourth channel. The first baseband processor, the second baseband processor, the first radio frequency chip, and the second radio frequency chip all support 3G or later-generation access capabilities. Because the first baseband processor and the second baseband processor each are provided with channels that are configured to transmit data and support 3G or later-generation access capabilities, two SIM cards can simultaneously perform services of 3G or later generations.

DESCRIPTION OF EMBODIMENTS

In the following description, to illustrate rather than limit, specific details such as a particular system structure, an interface, and a technology are provided to make a thorough understanding of the present invention. However, a person skilled in the art should know that the present invention may be practiced in other implementation manners without these specific details. In other cases, detailed descriptions of well-known apparatuses, circuits, and methods are omitted, so that the present invention is described without being obscured by unnecessary details.

A terminal described in the embodiments of the present invention may be a terminal device, such as a tablet computer, a notebook computer, a UMPC (ultra-mobile personal computer, ultra-mobile personal computer), a netbook, or a PDA (Personal Digital Assistant, personal digital assistant).

Figure 1:
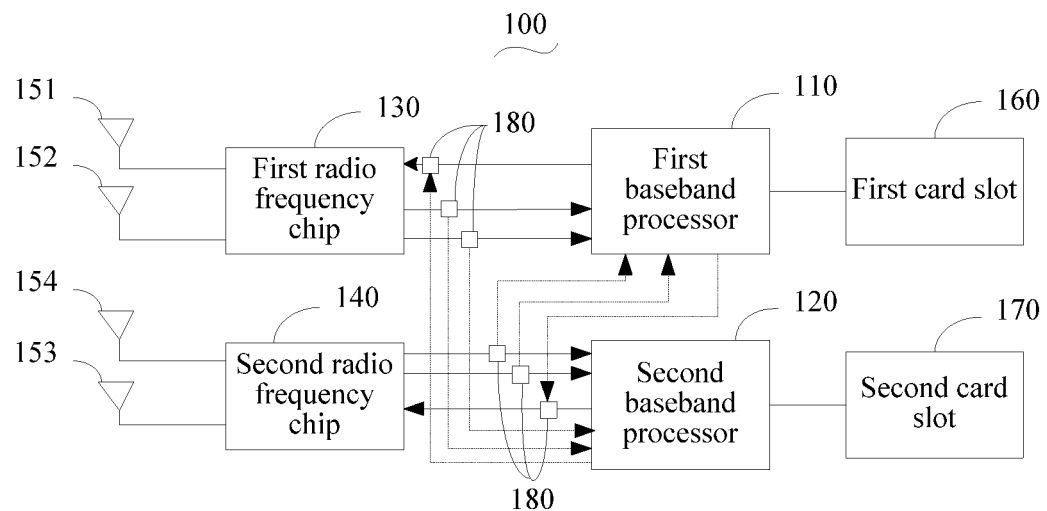
FIG. 1 is a schematic structural diagram of a terminal according to an embodiment of the present invention.

Referring to FIG. 1, FIG. 1 is a schematic structural diagram of a terminal according to an embodiment of the present invention. In this embodiment, a terminal 100 includes a first baseband processor 110, a second baseband processor 120, a first radio frequency chip 130, a second radio frequency chip 140, a first antenna 151, a second antenna 152, a third antenna 153, a fourth antenna 154, a first card slot 160 connected to the first baseband processor 110, and a second card slot 170 connected to the second baseband processor 120. The first card slot 160 and the second card slot 170 are both configured to accommodate SIM cards. The first baseband processor 110, the second baseband processor 120, the first radio frequency chip 130, and the second radio frequency chip 140 all support an access capability of a third-generation or later-generation mobile communications technology. The third-generation or later-generation mobile communications technology includes a third-generation mobile communications technology (3G), a fourth-generation mobile communications technology (4G), a fifth-generation mobile communications technology (5G), or the like. The 4G may include TD-LTE and FDD-LTE, may also include LTE Advanced (LTE Advanced), and may further include another technology meeting a next generation wireless communication standard IMT-Advanced (International Mobile Telephony Advanced, International Mobile Telephony Advanced) described by the International Telecommunication Union.

The first baseband processor 110 is connected to the first antenna 151 by using the first radio frequency chip 130, the first baseband processor 110 is connected to the second antenna 152 by using the first radio frequency chip 130, the second baseband processor 120 is connected to the third antenna 153 by using the second radio frequency chip 140, and the second baseband processor 120 is connected to the fourth antenna 154 by using the second radio frequency chip 140.

The first radio frequency chip 130 is connected to the first antenna 151 to form a first channel, the first radio frequency chip 130 is connected to the second antenna 152 to form a second channel, the second radio frequency chip 140 is connected to the third antenna 153 to form a third channel, and the second radio frequency chip 140 is connected to the fourth antenna 154 to form a fourth channel.

The first channel, the second channel, the third channel, and the fourth channel are configured to transmit data between the terminal 100 and an external device. The external device may be any network-side device such as a base station, or may be another terminal.

The first baseband processor 110 may be selectively connected to the third channel or the fourth channel. For example, a switch 180 may be disposed between the first baseband processor 110 and the second radio frequency chip 140, and the first baseband processor may be connected to or disconnected from the third channel or the fourth channel by controlling the switch 180. Specifically, as shown in FIG. 1, the first baseband processor 110 may be connected to the second radio frequency chip 140 by using the switch 180. When needing to transmit data by using the third channel, the first baseband processor 110 is connected to the third channel by controlling the switch 180; and when needing to transmit data by using the fourth channel, the first baseband processor 110 is connected to the fourth channel by controlling the switch 180. It should be noted that, the switch 180 may be a switch having a function of connecting or disconnecting multiple channels; or the switch 180 may be multiple switches, and one switch is disposed in each channel.

In an implementation of this embodiment, the first antenna 151 and the third antenna 153 may be main antennas that are configured to transmit uplink data and downlink data. Correspondingly, the first channel and the third channel are also configured to transmit the uplink data and downlink data. The second antenna 152 and the fourth antenna 154 may be diversity antennas that are configured to transmit downlink data. Corresponding, the second channel and the fourth channel are also configured to transmit the downlink data. It may be understood that, the foregoing antennas are not limited the foregoing types. That is, in another implementation, the foregoing antennas may be set as corresponding types of antennas according to actual requirements. For example, the foregoing antennas are all antennas that can transmit uplink data and downlink data. Alternatively, the first antenna and the third antenna are antennas that can transmit uplink data, and the second antenna and the fourth antenna are antennas that can transmit downlink data. The uplink data refers to data sent by the terminal to a network side, and the downlink data refers to data sent by the network side to the terminal.

Based on the foregoing terminal structure, after detecting that a SIM card is placed in the first card slot 160 connected to the first baseband processor 110, the first baseband processor 110 may perform third-generation or later-generation mobile communication (that is, 3G or later-generation services) with the external device by using the first channel and the second channel. Similarly, after detecting that a SIM card is placed in the second card slot 170 connected to the second baseband processor 120, the second baseband processor 120 may perform third-generation or later-generation mobile communication with the external device by using the third channel and the fourth channel. Because both the first baseband processor and the second baseband processor are provided with channels configured to transmit data, the first baseband processor and the second baseband processor can simultaneously perform the third-generation or later-generation mobile communication. That is, the terminal can simultaneously support 3G or later-generation services of multiple SIMs.

Further, to improve usage of the antennas and increase a data transmission rate, when the first baseband processor 110 performs data transmission with the external device, data transmission may also be performed by using the channels connected to the second baseband processor 120. For example, when the first baseband processor 110 transmits data by using the first channel, the first baseband processor 110 may transmit the data by using the first channel and the third channel if the third channel is idle. For another example, when the first baseband processor 110 transmits data by using the first channel and the second channel, the first baseband processor 110 transmits the data by using the first channel, the second channel, the third channel, and the fourth channel if the third channel and the fourth channel are idle. Alternatively, when the first baseband processor 110 transmits data by using the first channel and the second channel, the first baseband processor 110 transmits the data by using the first channel, the second channel, and the third channel if the third channel is idle. The third channel or the fourth channel is idle, that is, the second baseband processor 120 currently does not transmit data by using the third channel or the fourth channel.

It should be noted that, the two baseband processors (that is, the first baseband processor and the second baseband processor) both support 2G, 3G, and 4G access capabilities. That is, the first baseband processor may be connected to the first channel and the second channel to support the 4G access capability, and besides, among the first baseband processor, the first radio frequency chip, and the first antenna, there may also be a channel supporting the 2G and/or 3G access capability. The second baseband processor may be connected to the third channel and the fourth channel to support the 4G access capability, and besides, among the second baseband processor, the second radio frequency chip, and the second antenna, there may also be a channel supporting the 2G and/or 3G access capability. When both the first channel and the second channel are idle (that is, when the first baseband processor does not perform 4G services), the first channel and the second channel may be used by the second baseband processor. That is, the second baseband processor may perform the 4G services by using the first channel, the second channel, the third channel, and the fourth channel. In this case, the first baseband processor may support the 2G/3G access capability by using another channel, that is, the first baseband processor may currently perform 2G/3G services. The antenna supporting 2G and 3G and the antenna supporting 4G may share an antenna, and the sharing of the antenna may be implemented by using a diplexer (diplexer).

A baseband processor in the embodiments of the present invention may include a modem (modem) chip, may also include a modem chip and a CPU, or may include a modem chip and a digital signal processor (digital signal processor, DSP for short). The baseband processor may include a circuit or an integrated circuit (integrated circuit, IC for short). For example, the baseband processor may include a single packaged IC, or may include multiple connected packaged ICs that have same functions or different functions. In a terminal device, a baseband processor and an application processor (application processor) may be independent devices, or may be integrated in a device.

The following describes communication operating principles of the terminal 100 with reference to a specific example.

When the terminal 100 is turned on, the first baseband processor 110 and the second baseband processor 120 separately search for cells to be camped on and supported by SIM cards connected to the first baseband processor 110 and the second baseband processor 120, and separately access, according to identification information of the SIM cards connected to the first baseband processor 110 and the second baseband processor 120, communications networks of the corresponding cells to be camped on. For example, the first baseband processor 110 is connected to a 4G SIM card of a mobile operator (an operator) by using the first card slot 160, and the second baseband processor 120 is connected to a 4G SIM card of a Unicom operator (an operator) by using the second card slot 170. The first baseband processor 110 establishes, by using the first channel and the second channel, a connection to a mobile network of a cell to be camped on. The second baseband processor 120 establishes, by using the third channel and the fourth channel, a connection to a mobile network of a cell to be camped on.

In this example, the first antenna 151 and the third antenna 153 of the terminal are main antennas, and the second antenna 152 and the fourth antenna 154 are diversity antennas. When the first baseband processor 110 receives an uplink service processing request such as a data upload service request, the first baseband processor 110 sends uplink data by using the first channel. In this case, after determining that a mobile network connected to the first baseband processor 110 can support multi-channel transmission, the first baseband processor 110 determines whether the third channel that is connected to the second baseband processor 120 and also configured to transmit uplink data is idle. The first channel and the third channel jointly access the mobile network if the third channel is idle, and the uplink data is sent to the mobile network by using the first channel and the third channel. When the uplink data transmission is completed, the first baseband processor 110 may release the third channel.

When the first baseband processor 110 receives a downlink service processing request such as a data download service request, the first baseband processor 110 receives downlink data by using the first channel and the second channel. In this case, after determining that a mobile network connected to the first baseband processor 110 can support multi-channel transmission, the first baseband processor 110 determines whether the third channel and the fourth channel that are connected to the second baseband processor 120 and also configured to transmit downlink data are idle. The first channel, the second channel, and at least one of the third channel or the fourth channel jointly access the mobile network if the third channel and the fourth channel are idle, and the download data transmitted by using the mobile network is jointly received by using the first channel, the second channel, and the at least one of the third channel or the fourth channel. When the downlink data transmission is completed, the first baseband processor may release the occupied third channel and/or fourth channel.

The first baseband processor 110 may select, according to a network connected to the first baseband processor 110 or requirements of a service to be processed, any one or two of the third channel or the fourth channel to transmit data. The requirements of the service include a volume of data to be transmitted of the service, requirements on a communication rate and communication quality, and the like. For example, if a network connected to the first baseband processor 110 supports only three-channel data transmission, or a requirement of a current service on communication quality is not high and a volume of data to be transmitted is not large, the first baseband processor 110 may select only the third channel to transmit the data together with the first channel and the second channel. If a network connected to the first baseband processor 110 can support four-channel data transmission, or a requirement of a current service on communication quality is high, or a volume of data to be transmitted is large, the first baseband processor 110 may select the third channel and the fourth channel to transmit the data together with the first channel and the second channel.

When multiple antennas are used to send or receive data, a MIMO (Multiple-Input Multiple-Output, Multiple-Input Multiple-Output) technology may be used. When the first baseband processor 110 and a communications network thereof both support the MIMO, the first baseband processor 110 may use antennas on the corresponding channels of the first baseband processor 110 and an antenna on a corresponding idle channel of the second baseband processor to form a MIMO antenna. That is, multiple transmit antennas and receive antennas are used separately on a transmit end and a receive end, so that a signal is transmitted and received by using multiple antennas of the transmit end and the receive end, to improve data transmission quality. For example, when the first baseband processor 110 sends uplink data by using the first channel, and the third channel is idle, the first baseband processor 110 use the first antenna and the third antenna to form a MIMO antenna to send the uplink data. For another example, when the first baseband processor 110 receives downlink data by using the first channel and the second channel, and the third channel is idle, the first baseband processor 110 uses the first antenna, the second antenna, and the third antenna to form a MIMO antenna to receive the downlink data.

It may be understood that, when the first baseband processor 110 transmits data by using a channel connected to the second baseband processor 120, if it is detected that the second baseband processor 120 has a data transmission requirement, at least one channel connected to the second baseband processor 120 is yielded, so that the second baseband processor 120 performs data transmission by using the yielded channel.

In the terminal 100, the second baseband processor 120 is similar to the first baseband processor 110. When performing data transmission with an external device, the second baseband processor 120 may also use a channel connected to the first baseband processor 110 to perform the data transmission. For example, the second baseband processor 120 is connected to the first radio frequency chip 130 by using the switch 180. The second baseband processor 120 may be connected to or disconnected from the first channel or the second channel by controlling the switch 180. When the second baseband processor 120 transmits data by using the third channel, the second baseband processor 120 may transmit the data by using the first channel and the third channel if the first channel is idle. For another example, when the second baseband processor 120 transmits data by using the third channel and the fourth channel, the second baseband processor 120 transmits the data by using the first channel, the second channel, the third channel, and the fourth channel if both the first channel and the second channel are idle. Alternatively, when the second baseband processor 120 transmits data by using the third channel and the fourth channel, the second baseband processor 120 transmits the data by using the first channel, the third channel, and the fourth channel if the first channel is idle. Refer to the specific description of the communication manner of the foregoing first baseband processor for details, and details are not described herein again.

Figure 2:
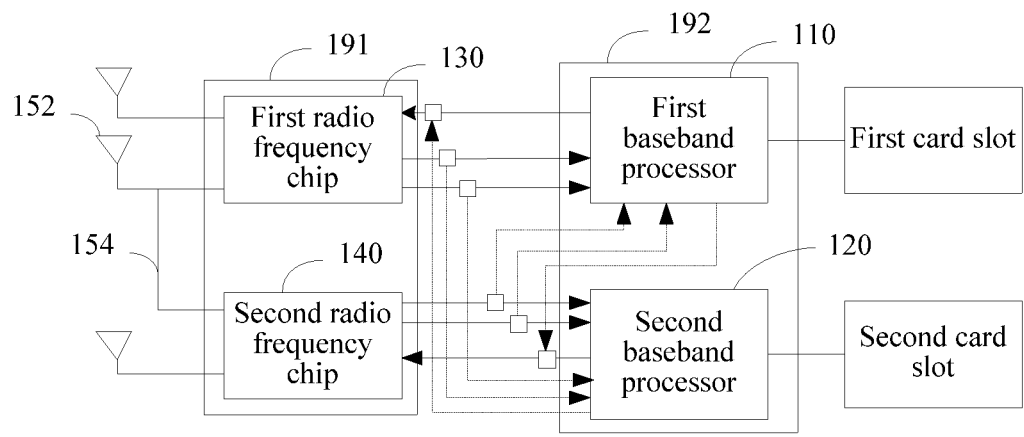
FIG. 2 is a schematic structural diagram of another terminal according to an embodiment of the present invention.

It should be noted that, in this embodiment, the second antenna 152 and the fourth antenna 154 are independently disposed in the terminal 100, the first baseband processor 110 and the second baseband processor 120 are independently disposed in the terminal 100, and the first radio frequency chip 130 and the second radio frequency chip 140 are independently disposed in the terminal 100. However, in another embodiment, a second antenna 152 and a fourth antenna 154 may be a same antenna, a first baseband processor 110 and a second baseband processor 120 may also be integrated in a processor 192, and the first radio frequency chip 130 and the second radio frequency chip 140 may also be disposed in a same radio frequency chip 191, as shown in FIG. 2. The second antenna 152 and the fourth antenna 154 are a same antenna, for example, a diversity antenna. That is, the first baseband processor 110 and the second baseband processor 120 may share a diversity antenna.

Figure 3:
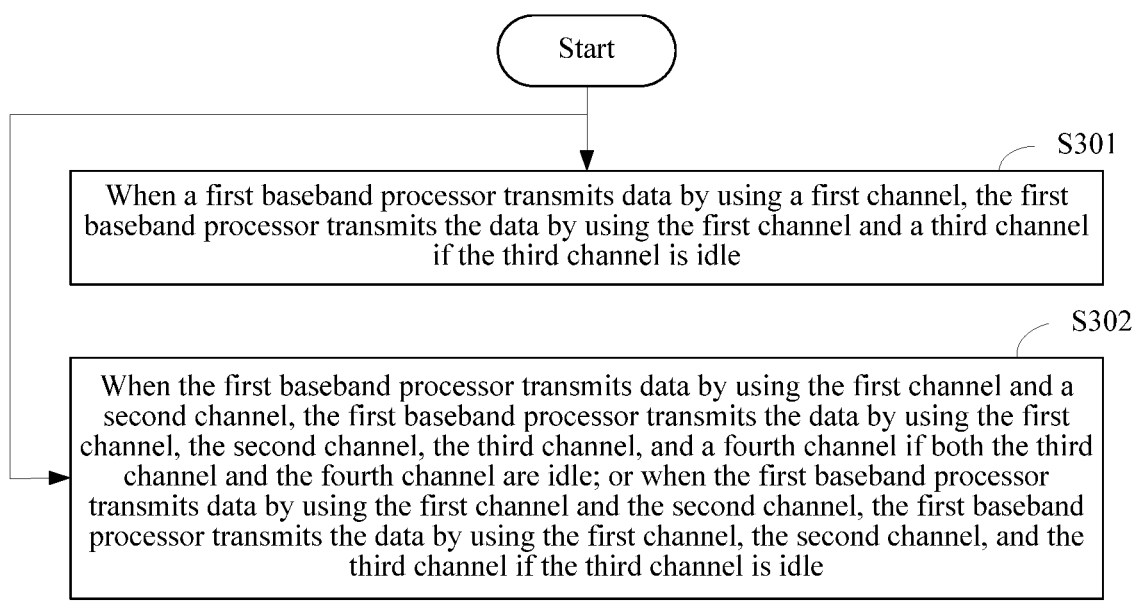
FIG. 3 is a flowchart of a communication method of a terminal according to an embodiment of the present invention.

Referring to FIG. 3, FIG. 3 is a flowchart of a communication method of a terminal according to an embodiment of the present invention. The terminal is the terminal described in the foregoing embodiments. Refer to the description of the foregoing embodiments for details, and details are not described herein again. The communication method of the terminal includes the following steps.

S301: When the first baseband processor transmits data by using the first channel, the first baseband processor transmits the data by using the first channel and the third channel if the third channel is idle.

For example, the first antenna and the third antenna of the terminal are the foregoing main antennas, and the second antenna and the fourth antenna are the foregoing diversity antennas. That is, the first channel and the third channel are configured to transmit uplink data and downlink data, and the second channel and the fourth channel are configured to transmit downlink data.

When the first baseband processor receives an uplink service processing request such as a data upload service request, the first baseband processor sends uplink data by using the first channel. In this case, after determining that a mobile network connected to the first baseband processor can support multi-channel transmission, the first baseband processor determines whether the third channel that is connected to the second baseband processor and also configured to transmit uplink data is idle. The first channel and the third channel jointly access the mobile network if the third channel is idle, and the uplink data is sent to the mobile network by using the first channel and the third channel.

When the uplink data transmission is completed, the first baseband processor may release the third channel.

S302: When the first baseband processor transmits data by using the first channel and the second channel, the first baseband processor transmits the data by using the first channel, the second channel, the third channel, and the fourth channel if both the third channel and the fourth channel are idle; or when the first baseband processor transmits data by using the first channel and the second channel, the first baseband processor transmits the data by using the first channel, the second channel, and the third channel if the third channel is idle.

Following the example in S301, when the first baseband processor receives a downlink service processing request such as a data download service request, the first baseband processor 110 receives downlink data by using the first channel and the second channel. In this case, after determining that a mobile network connected to the first baseband processor 110 can support multi-channel transmission, the first baseband processor 110 determines whether the third channel and the fourth channel that are connected to the second baseband processor and also configured to transmit downlink data are idle. The first channel, the second channel, and at least one of the third channel or the fourth channel jointly access the mobile network if the third channel and the fourth channel are idle, and the download data transmitted by using the mobile network is jointly received by using the first channel, the second channel, and the at least one of the third channel or the fourth channel.

When the downlink data transmission is completed, the first baseband processor may release the occupied third channel and/or fourth channel.

The first baseband processor may select, according to a network connected to the first baseband processor or requirements of a service to be processed, any one or two of the third channel or the fourth channel to transmit data. The requirements of the service include a volume of data to be transmitted of the service, requirements on a communication rate and communication quality, and the like. For example, if a network connected to the first baseband processor supports only three-channel data transmission, or a requirement of a current service on communication quality is not high and a volume of data to be transmitted is not large, the first baseband processor may select only the third channel to transmit the data together with the first channel and the second channel. If a network connected to the first baseband processor can support four-channel data transmission, or a requirement of a current service on communication quality is high, or a volume of data to be transmitted is large, the first baseband processor may select the third channel and the fourth channel to transmit the data together with the first channel, and the second channel.

In other embodiments, the communication method of the terminal may only include step S301 or step S302.

In another embodiment, S301 may specifically include: when the first baseband processor sends uplink data by using the first channel, and the third channel is idle, using, by the first baseband processor, the first antenna and the third antenna to form a MIMO antenna to send the uplink data. S302 may specifically include: when the first baseband processor receives downlink data by using the first channel and the second channel, and the third channel is idle, using, by the first baseband processor, the first antenna, the second antenna, and the third antenna to form a MIMO antenna to receive the downlink data; or when the first baseband processor receives downlink data by using the first channel and the second channel, and both the third channel and the fourth channel are idle, using, by the first baseband processor, the first antenna, the second antenna, the third antenna, and the fourth antenna to form a MIMO antenna to receive the downlink data.

In the foregoing embodiment, the communication method may further include: when transmitting the data by using a channel (for example, the third channel, or the third channel and the fourth channel) connected to the second baseband processor, yielding, by the first baseband processor, at least one channel connected to the second baseband processor if it is detected that the second baseband processor has a data transmission requirement, so that the second baseband processor performs data transmission by using the yielded channel.

In the foregoing embodiment, the communication method may further include: when performing data transmission with an external device, performing, by the second baseband processor, the data transmission by using a channel (for example, the first channel, or the first channel and the second channel) connected to the first baseband processor. Details are similar to the step of performing, by the first baseband processor, the data transmission by using the channel of the second baseband processor. For example, when the second baseband processor transmits data by using the third channel, the second baseband processor transmits the data by using the first channel and the third channel if the first channel is idle. For another example, when the second baseband processor transmits data by using the third channel and the fourth channel, the second baseband processor transmits the data by using the first channel, the second channel, the third channel, and the fourth channel if both the first channel and the second channel are idle. Alternatively, when the second baseband processor transmits data by using the third channel and the fourth channel, the second baseband processor transmits the data by using the first channel, the third channel, and the fourth channel if the first channel is idle.

According to the embodiments of the present invention, the terminal is provided with a first baseband processor and a second baseband processor. The first baseband processor is connected to a first antenna and a second antenna by using a first radio frequency chip, and the second baseband processor is connected to a third antenna and a fourth antenna by using a second radio frequency chip. The first radio frequency chip is connected to the first antenna to form a first channel, the first radio frequency chip is connected to the second antenna to form a second channel, the second radio frequency chip is connected to the third antenna to form a third channel, and the second radio frequency chip is connected to the fourth antenna to form a fourth channel. The first baseband processor, the second baseband processor, the first radio frequency chip, and the second radio frequency chip all support 3G or later-generation access capabilities. Because the first baseband processor and the second baseband processor each are provided with channels that are configured to transmit data and support 3G or later-generation access capabilities, two SIM cards can simultaneously perform services of 3G or later generations. Further, when performing data transmission by using the channels connected to the first baseband processor, the first baseband processor may use an idle channel connected to the second baseband processor to perform the data transmission. That is, the first baseband processor can dynamically configure the channels connected to the first baseband processor and the second baseband processor, so as to improve usage of the antennas and increase a data transmission rate.

In the several implementations provided in the embodiments of the present invention, it should be understood that the disclosed system, apparatus, and method may be implemented in other manners. For example, the described apparatus implementation is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in implementations of the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions in the embodiments of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor (processor) to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

What is claimed is:

1. A terminal, comprising:
   a first antenna;
   a second antenna;
   a third antenna;
   a fourth antenna;
   a first radio frequency chip;
   a second radio frequency chip;
   a first baseband processor coupled to the first antenna using the first radio frequency chip, wherein the first radio frequency chip is coupled to the first antenna to form a first channel, wherein the first baseband processor is further coupled to the second antenna using the first radio frequency chip, and wherein the first radio frequency chip is connected to the second antenna to form a second channel;
   a first card slot coupled to the first baseband processor;
   a second baseband processor coupled to the third antenna using the second radio frequency chip, wherein the second radio frequency chip is coupled to the third antenna to form a third channel, wherein the second baseband processor is further coupled to the fourth antenna using the second radio frequency chip, and wherein the second radio frequency chip is coupled to the fourth antenna to form a fourth channel;
a second card slot coupled to the second baseband processor,
wherein the first baseband processor, the first card slot, the second baseband processor, the second card slot, the first radio frequency chip, and the second radio frequency chip all are configured to support an access capability of a fifth-generation mobile communications technology (5G) in the 2.5-3.7 GHz range, and wherein
when the first baseband processor transmits data using the first channel, the first baseband processor transmits the data using the first channel and the third channel when the third channel is idle; or
when the first baseband processor transmits data using the first channel and the second channel, the first baseband processor transmits the data using the first channel, the second channel, the third channel, and the fourth channel when the third channel and the fourth channel are idle; or
when the first baseband processor transmits data using the first channel and the second channel, the first baseband processor transmits the data using the first channel, the second channel, and the third channel when the third channel is idle.

2. The terminal of claim 1, wherein the first card slot comprises a subscriber identity module (SIM) card.

3. The terminal of claim 1, wherein the second card slot comprises a subscriber identity module (SIM) card.

4. The terminal of claim 1, wherein the second antenna and the fourth antenna are a same antenna.

5. The terminal of claim 1, wherein the second antenna and the fourth antenna are independently disposed in the terminal.

6. The terminal of claim 1, wherein the first antenna and the third antenna are main antennas, and the second antenna and the fourth antenna are diversity antennas.

7. A processor system, comprising:
a first baseband processor, including a first uplink interface and a first downlink interface; and a second baseband processor, including a second uplink interface and a second downlink interface, wherein
when the first baseband processor transmits data using the first downlink interface, the first baseband processor transmits the data using the first downlink interface and the second downlink interface when the second downlink interface is idle, or
when the first baseband processor transmits data using the first uplink interface, the first baseband processor transmits the data using the first uplink interface and the second uplink interface when the second uplink interface is idle, or
when the first baseband processor transmits data using the first uplink interface and the first downlink interface, the first baseband processor transmits the data using the first uplink interface, the first downlink interface, the second uplink interface and the second downlink interface when the second uplink interface and the second downlink interface are idle, or
when the first baseband processor transmits data using the first uplink interface and the first downlink interface, the first baseband processor transmits the data using the first uplink interface, the first downlink interface and the second downlink interface when the second downlink interface is idle, or
when the first baseband processor transmits data using the first uplink interface and the first downlink interface, the first baseband processor transmits the data using the first uplink interface, the first downlink interface and the second uplink interface when the second uplink interface is idle,
wherein the first baseband processor is coupled with a first subscriber identity module (SIM) card, wherein the second baseband processor is coupled with a second SIM card, and wherein both the first baseband processor and the second baseband processor are configured to simultaneously support an access capability of a fifth-generation (5G) mobile communications technology configured to provide communications in the 2.5-3.7 GHz range.

8. The processor system of claim 7, wherein the first baseband processor and the second baseband processor are integrated in one processor.

9. The processor system of claim 7, wherein the first baseband processor and the second baseband processor are independently disposed in the processor system.

10. A communication method of a processor system, wherein the processor system comprises:
a first baseband processor, including a first uplink interface and a first downlink interface, and coupled with a first subscriber identity module (SIM) card; and a second baseband processor, including a second uplink interface and a second downlink interface, and coupled with a second SIM card, wherein both the first baseband processor and the second baseband processor are configured to support an access capability of a fifth-generation mobile communications technology (5G);
the communication method comprising transmitting in the 2.5-3.7 GHz range:
when the first baseband processor transmits data using the first downlink interface, the first baseband processor transmits the data using the first downlink interface and the second downlink interface when the second downlink interface is idle; or
when the first baseband processor transmits data using the first uplink interface, the first baseband processor transmits the data using the first uplink interface and the second uplink interface when the second uplink interface is idle; or
when the first baseband processor transmits data using the first uplink interface and the first downlink interface, the first baseband processor transmits the data using the first uplink interface, the first downlink interface, the second uplink interface and the second downlink interface when the second uplink interface and the second downlink interface are idle; or
when the first baseband processor transmits data using the first uplink interface and the first downlink interface, the first baseband processor transmits the data using the first uplink interface, the first downlink interface and the second downlink interface when the second downlink interface is idle; or
when the first baseband processor transmits data using the first uplink interface and the first downlink interface, the first baseband processor transmits the data using the first uplink interface, the first downlink interface and the second uplink interface when the second uplink interface is idle.

11. The communication method of claim 10, wherein the first baseband processor and the second baseband processor are integrated in one processor.

12. The communication method of claim 10, wherein the first baseband processor and the second baseband processor are independently disposed in the processor system.

13. The terminal of claim 1, wherein the 5G mobile communications technology is configured to provide communications in the 600-700 MHz range.

14. The terminal of claim 1, wherein the 5G mobile communications technology is configured to provide communications in the 25-39 GHz range.

15. The terminal of claim 1, wherein both the first baseband processor and the second baseband processor are configured to simultaneously support an access capability of a fifth-generation (5G) mobile communications technology.

16. The processor system of claim 7, wherein the 5G mobile communications technology is configured to provide communications in the 25-39 GHz range.

17. The communication method of claim 10, comprising providing communications in the 25-39 GHz range.

18. The processor system of claim 7, wherein the 5G mobile communications technology is configured to provide communications in the 600-700 MHz range.

19. The communications method of claim 10, comprising providing communications in the 600-700 MHz range.

20. The communications method of claim 10, comprising both the first baseband processor and the second baseband processor simultaneously supporting an access capability of a fifth-generation (5G) mobile communications technology.

* * * * *